United States Patent [19]

Cronley

[11] Patent Number: 5,503,437
[45] Date of Patent: Apr. 2, 1996

[54] ONE-PIECE COUPLER FOR CONNECTING HOSES

[76] Inventor: Gerald J. Cronley, 3636 Lake Lynn Dr., Gretna, La. 70056

[21] Appl. No.: 323,489

[22] Filed: Oct. 14, 1994

[51] Int. Cl.$^6$ ....................................................... F16L 37/10
[52] U.S. Cl. ............................ 285/34; 286/322; 286/315; 286/393
[58] Field of Search ............................... 285/34, 35, 322, 285/323, 357, 392, 393, 315

[56] References Cited

U.S. PATENT DOCUMENTS

| | | | |
|---|---|---|---|
| 1,297,719 | 3/1919 | Myers | 285/322 X |
| 1,315,784 | 9/1919 | Levitt | 285/322 X |
| 2,327,714 | 8/1943 | Iftiger, Sr. | 285/35 |
| 2,383,692 | 8/1945 | Smith | 285/322 |
| 2,388,179 | 10/1945 | Prowd | 285/35 |
| 3,394,950 | 7/1968 | Jensen | 285/35 |

FOREIGN PATENT DOCUMENTS

| | | | |
|---|---|---|---|
| 968388 | 5/1975 | Canada | 285/322 |
| 572729 | 6/1924 | France | 285/322 |
| 1210637 | 2/1966 | Germany | 285/322 |
| 789 | of 1906 | United Kingdom | 285/393 |
| 180804 | 6/1922 | United Kingdom | 285/322 |
| 1241167 | 7/1971 | United Kingdom | 285/322 |

Primary Examiner—Randolph A. Reese
Assistant Examiner—Heather Chun Shackelford
Attorney, Agent, or Firm—Milton S. Gerstein

[57] ABSTRACT

A hose-coupler made up of a just one component having a main housing section with a female end and a male end. The second female end of the coupler is formed with interior threads, for receiving therein a portion of the male end of the second hose. The main housing section has a compressible portion adjacent to the first male end thereof all the way to the end of the female end. The compressible portion is provided by a plurality of circumferentially spaced-apart linear slots for forming a plurality of clamping jaws or elements, so that, when these clamping jaws are compressed toward each other, the interior threads of the female end of the coupler is forced into locking, threaded engagement with the exterior threads of the male end of the second hose telescopingly received therein. In order to compress the clamping jaws, there is provided a collet rotatably-mounted about the main housing's compressible section. The sleeve is used for compressing the jaws for locking the male end of the second hose to the coupler's female end.

6 Claims, 2 Drawing Sheets

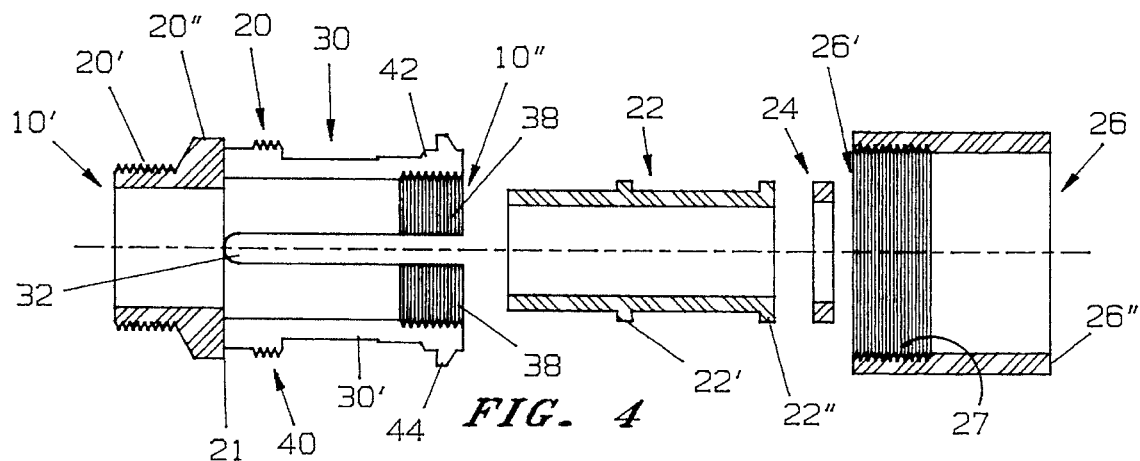
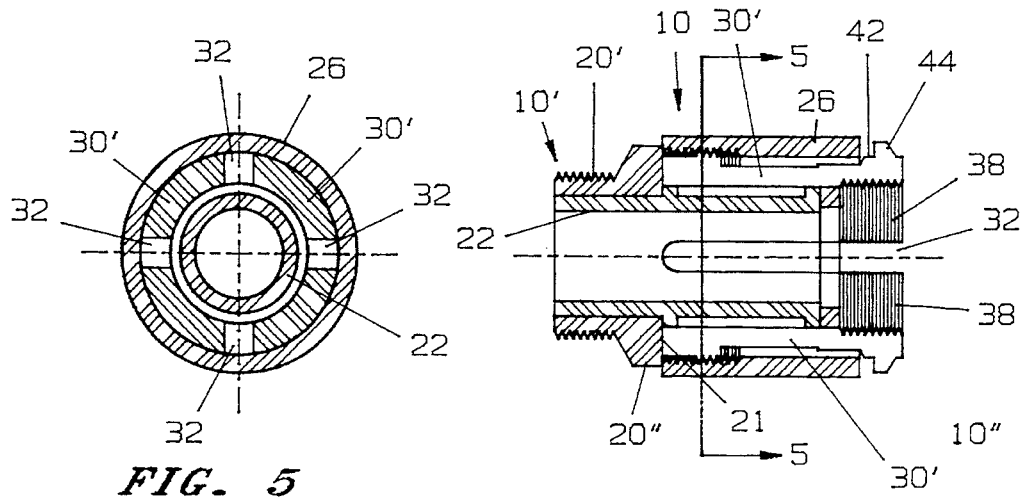
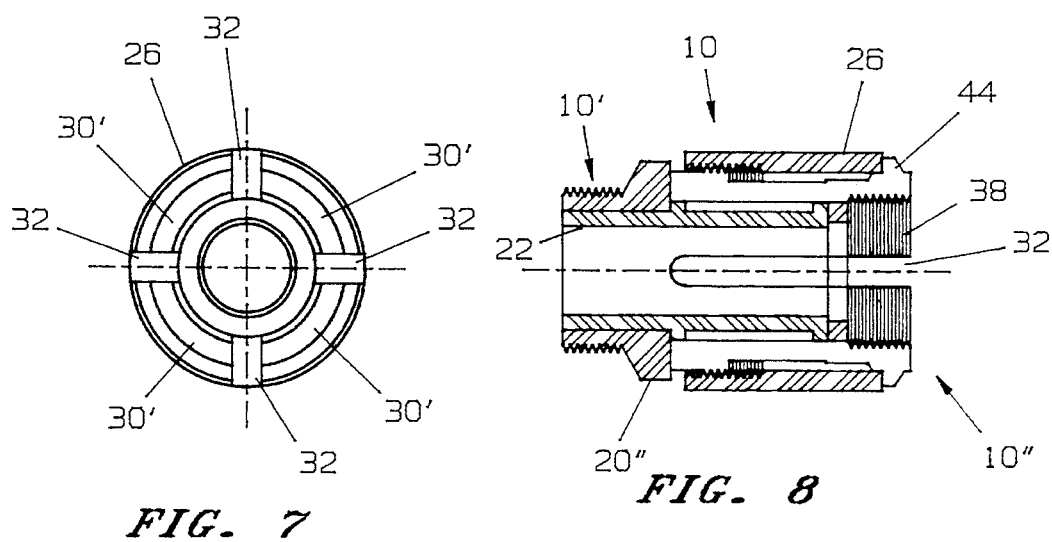

5,503,437

ONE-PIECE COUPLER FOR CONNECTING HOSES

BACKGROUND OF THE INVENTION

The present invention is directed to a coupler for connecting the ends of two hoses together. There are presently hose-connectors for connecting the ends of hoses, which prior-art hose-connectors are made up of two, interconnecting components. Each component, or part, has a male end and a female end. The male end of the first component is connectable to the female end of one hose, while the female end of the other component is connectable to the male end of another hose. The female end of the first component and the male end of the second component are, then, telescopingly mounted together to complete the coupling of the ends of the hoses. The first component of the coupler is provided with interior roller bearings at the female end thereof, for releasably gripping an annular groove formed in the male end of the second component, whereby the two components of this prior-art coupler are interconnected. To de-couple the two components, there is provided a retractable outer sleeve that slides over the female end of the first component. In its fully retracted position, which is achieved by overcoming a biassing force that normally pushes the sleeve into its locking position, the sleeve allows the roller bearings to be pushed into the interior of the housing of the first component, whereby the male end of the second may then be pulled out in order to decouple the two hoses. When the sleeve in its unretracted position, it prevents the roller bearings from entering into the housing of the first component, whereby the rollers bearings are prevented from escaping out of the annular groove formed in the male end of the second component, thus firmly locking the two component together for coupling the two hoses together.

While the prior-art coupler is effective, it suffers from a number of disadvantages. The prior-art coupler requires two separate parts or components, as above-described: One component fitting over the female end of the first hose, and a second component fitting in the male end of the second hose. Thus, not only is the cost for making such a coupler considerable, owing to the plurality of parts, but, moreover, if one of the two components of the coupler is lost, then the two hoses may not be coupled together until a replacement-component is purchased. It is not uncommon for a retailer to sell only the complete, two-component coupler, but not each individual component separately. Thus, it is not uncommon that, if one component is lost, the user must purchase an entirely new coupler of two components, since replacement component-parts are not, typically, readily available. This, again, adds considerable cost to the user.

SUMMARY OF THE INVENTION

It is, therefore, the primary objective of the present invention to provide a coupler for hoses which is made of only one component part, and not two, and which, thus saves considerably on the cost of manufacture and the cost to the consumer.

It is another objective of the present invention to provide a coupler for hoses which is considerably easier to use than the prior-art, two-piece coupler.

Toward these and other ends, the hose-coupler of the invention is made up of a just one component having a main housing section with a female end and a male end. One male end of the coupler is received in the female end of a first hose, and the other female end of the coupler receives a male end of a second hose to be fluidly coupled to the first hose. The first male end of the coupler is provided, in a conventional manner, with exterior threads that mate with the interior threads of the female end of the first hose. The second female end of the coupler is formed with interior threads, for receiving therein a portion of the male end of the second hose. The main housing section has a compressible portion from adjacent to the first male end thereof all the way to the end of the female end. The compressible portion is provided by means of a plurality of circumferentially spaced-apart linear slots, extending in the longitudinal axial direction, for forming a plurality of clamping jaws or sections so that when these clamping jaws are compressed toward each other, the interior threads of the female end of the coupler is forced into locking, threaded engagement with the exterior threads of the male end of the second hose telescopingly received therein. In order to compress the clamping jaws, in order to lock the male end of the second hose in the female end of the coupler, there is provided a rotatable locking sleeve or collet rotatably-mounted about the main housing's compressible section. The sleeve is used for compressing the jaws for locking the male end of the second hose to the coupler's female end. The rotatable locking collet has a first end that engages with exterior threads formed on the outer circumference of the housing of the coupler, whereby rotating the sleeve in one direction causes it to approach the male end of the second hose, while rotating it in the opposite direction, moves it away from the male end of the second hose. The sleeve has a second end which cooperates with an annular camming surface formed about the annular sections of the female end of the coupler. When the sleeve is rotated in a first direction and moved toward the female end of the coupler, the second end of the sleeve slides against the annular, camming surfaces, forcing the clamping sections inwardly, to thereby clamp the interior threaded sections of the annular sections of the female end of the coupler against the exterior threads of the male end of the second hose inserted therein. For uncoupling the two hoses, the sleeve is simply rotated in the opposite direction, whereby the annular sections are unclamped.

BRIEF DESCRIPTION OF THE DRAWING

The invention will be more readily understood with reference to the accompanying drawing, wherein:

FIG. 4 is an assembly view, in longitudinal cross section, showing the separate sections of the hose coupler of the invention;

FIG. 5 is a cross-sectional view taken along line 5—5 of FIG. 6;

FIG. 6 is a longitudinal cross-sectional view through the hose coupler of FIG. 3, with the rotatable clamping sleeve in its non-clamping state;

FIG. 7 is a front view of the hose coupler of FIG. 3; and

FIG. 8 is a longitudinal cross-sectional view similar to FIG. 6, showing the rotatable clamping sleeve in its clamping state;

FIG. 8 is a cross-sectional view taken along line 8—8 of FIG. 6.

DETAILED DESCRIPTION OF THE INVENTION

Figure 1:
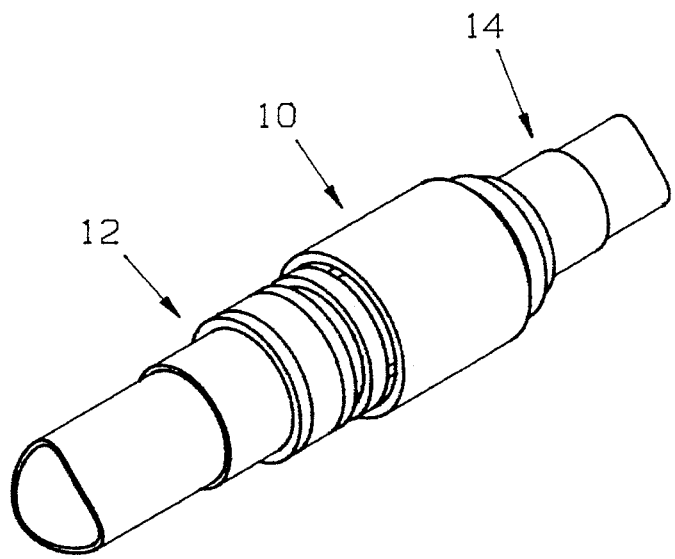
FIG. 1 is an isometric view of the hose coupler of the invention shown connected between the ends of two hoses.
Figure 2:
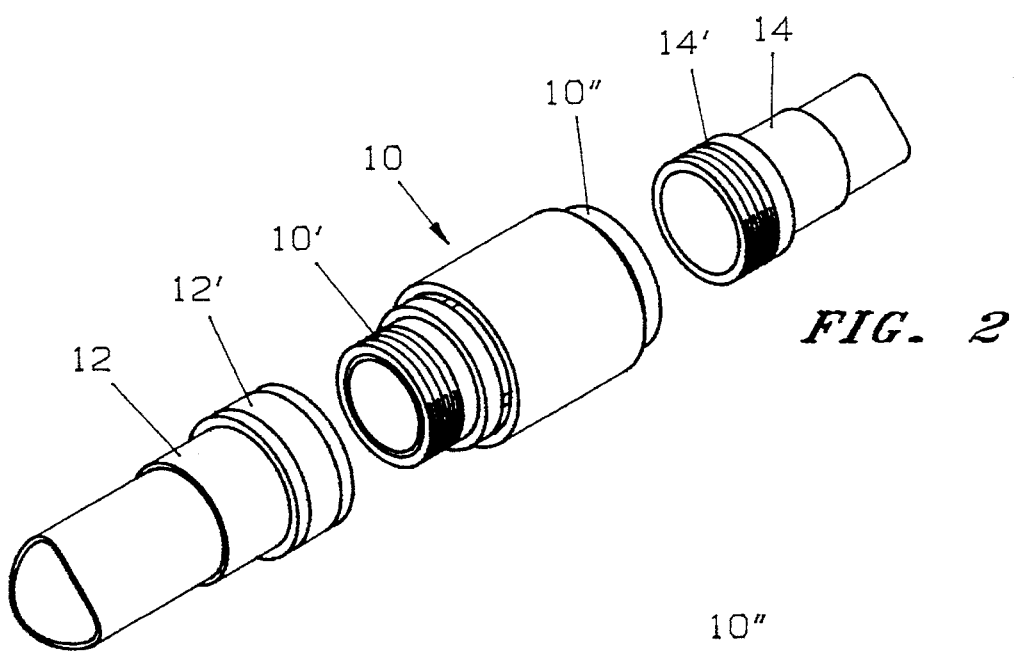
FIG. 2 is an isometric view of the hose coupler of the invention showing how the ends of two hoses are coupled together thereby.
Figure 3:
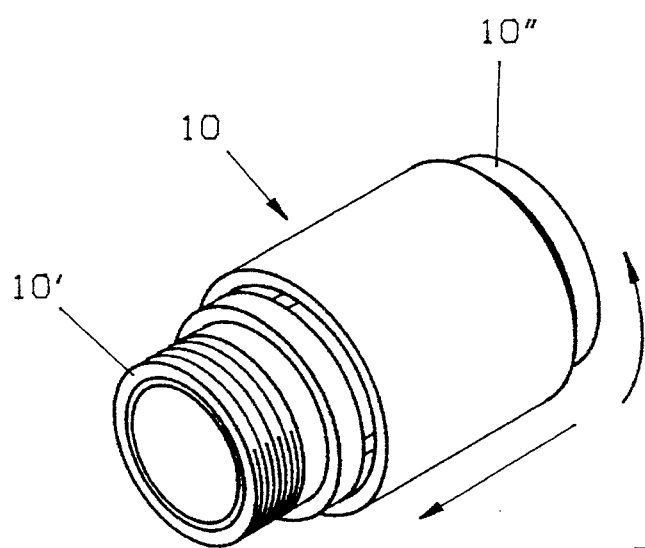
FIG. 3 is an isometric view of the hose coupler of the invention itself.

Referring now to the drawings in greater detail, where like reference numerals indicate like parts, the hose coupler of the invention is indicated generally by reference numeral 10. Referring to FIGS. 1–3 for now, the coupler 10 is a one-piece component, unlike the prior-art hose couplers that are two-piece couplers. The coupler 10 interconnects a female end 12' of a first hose 12 to a male end of 14' of a second hose 14. The coupler, therefore, has a male end 10' having exterior threads for being mounted within the female end 12' of the first hose. The coupler 10 also has a second female end 10" that telescopingly receives therein the male end 14' of the second hose 14. The female connecting end 10" of the coupler 10 is provided with interior threads for engagement with the exterior threads of the threaded male end 14' of the second hose 14. However, it is not practical, nor in most circumstances possible, to allow for the threaded male end 14' of the second hose to be rotated into the threaded female connecting end 10" of the coupler, since, when the other end of the hose is coupled to a water source or to another hose, such rotation will cause the hose or tubing 14 to twist, which would result in the twisting of the hose 14 itself, thus impeding the flow of water therethrough. In most cases, however, it is not possible to rotate the male end the requisite number of turns to achieve a water-tight, sealing connection with the female end, whether the other, female end of the hose is, or is not, connected to another male connection. Therefore, in accordance with the present invention, the connecting female end 10" of the coupler 10 is made as an expandable mandrel or arbor, which is forced or compressed against the threads of the male end 14' inserted therein by means of a collet, as described hereinbelow.

Referring to FIGS. 4–8, the single-component hose coupler 10 is made up of four, separate, interconnected parts: A main housing 20, an interior, gasket-mounting sleeve 22, a gasket or washer proper 24, and an outer rotatable-slidable collet 26. The main housing 20 has a first section that is an exterior-threaded first end 20' that constitutes the connecting male end 10' of the coupler 10 shown in FIGS. 1–3. The first end 20' of the main housing terminates in an enlarged, annular flange 20". The main housing has a second section 30 extending from the interior-facing surface 21 of the enlarged, annular flange 20" which is formed as a contractible mandrel having a plurality of arcuate jaws or elements, 30'. Preferably, there are provided four such jaw elements 30', as seen in FIGS. 5 and 7. These four jaw elements are formed by means of four longitudinally-extending, linear slots 32 that extend the full length of the second section 30 of the main housing. The four, longitudinally-extending, linear slots 32 are spaced 90 degrees apart, so that each jaw element has an arcuate expanse approximately equal to 90 degrees.

The end-portion of the second section 30, away from the portion thereof connected to the interior surface 21, constitutes the female end 10" of the coupler, shown in FIGS. 1–3. This female end 10" is formed with interior threads 38 that extend along the interior surface-portions of the four jaw-elements 30'. Thus, the female end 10" of the coupler is that part of the second section 30 of the main housing, at the free end-portion thereof, in which there are provided interior threads in the four jaw elements 30'.

The outer surface of the second section 30 of the main housing 20 is provided with exterior threads 40 relatively adjacent to the interior surface 21. These exterior threads 40 mate with the interior threads 27 formed in the interior surface of the first end 26' of the rotatable collet 26, whereby the collet 26 is rotatably mounted on the main housing for movement toward and away from the female end 10"for contracting the four jaw elements 30'as described hereinbelow. The other, free end-portion of the second section 20 of the main housing has an annular bead or camming surface 42, which is divided into four arcuate sections by reason of the fact that the second section 30 is made up of four, arcuate jaw-sections 30'. The free end-portion of the second section 30 also has an annular limit stop 44 which limits the rightward movement of the collet 26, when viewing FIG. 4. The projecting annular bead or rim 44 interferes with the rightward-travel of the collet 26, when the collet 26 is manually rotated in a first direction, whereby the collet 26 will force the four jaw elements 30' to contract, or compress, to thereby force the interior threads 38 on the interior surfaces of the four jaw elements constituting the female end 10" against the exterior threads of the male end 14' of the second hose 14 inserted therein. The amount of the rotation of the collet is determined by the annular limit stop 44, when the second end 26" abuts thereagainst. In this rightward-most position of the collet 26, the male end of the second hose 14 is locked in place by engagement of the exterior threads thereof with the interior threads 38 of the female end 10" of the coupler. In order to unlock, or release, the male end 14' of the hose 14, the collet 26 is simply rotated in the opposite direction, with the interior face 21 of the enlarged, annular flange 20" constituting a limit stop to further leftward-movement of the collet, when viewing FIG. 4. In this leftward-most position, the male end 14' of the hose 14 may then be easily pulled out of the female end 10" of the coupler, since the locking engagement between the interior threads 38 of the female end 10" with the exterior threads of the male end 14' has been terminated. When the male end 14' is to be again reinserted into the female end 10", it is simply slid therein, without any need of rotating the male end 14'; after such insertion, then the collet 26 is again rotated in the first direction to move rightward, as above-described.

The interior, gasket-mounting sleeve 22 has a diameter less than that of the hollow interior of the main housing and less than that of the hollow interior of the first end 10' of the coupler, so that it may be telescopingly received in the main housing. The gasket-mounting sleeve 22 has a first, intermediate-located, annular flange 22', which abuts against the interior surface 21 for mounting the gasket-mounting sleeve 22 in the main housing, whereby it may only be removed by sliding it out through the female end 10". A second, annular flange 22" is provided, and against which washer or gasket 24 abuts, as seen in FIGS. 6 and 8. The male end 14' of the second hose 14 is inserted in the female end 10" until its end face abuts against the face of the washer 24. When the collet 26 is moved rightward to lock the mating ends, by contracting the four jaw elements, it also causes the four jaw elements to clamp against the circumferential surface of the washer 24, in order to provide a fluid-tight seal between the male end 14' and the female end 10" of the coupler 10.

The coupler 10 may be made of plastic, such as PVC, brass, and the like. In addition, while the preferred embodiment utilizes a rotatable collet for achieving the translational or sliding movement for contracting the jaw elements 30', it is within the scope and purview of the invention to provide a simple sliding sleeve that is manually slid to the right, when viewing FIG. 6, for contracting the jaw elements, and to the left to allow them to expand back to their normal states. Thus, instead of the exterior threads 40 on the outer housing and the interior threads 27 in the collet 26, these may be replaced with a conventional, dovetail-type connection between the collet 26 and the main housing 20, to achieve just sliding movement to the collet 26 without any rotational movement.

It is also to be noted that while the preferred embodiment has been disclosed as coupling the ends of two hoses, it is within the scope and purview of the invention to couple any tubing where it is necessary to couple a female end of a first tube to a male end of a second tube. Thus, the invention may be used in a variety of disciplines and arts, and may be used in environments for transporting gases as well as liquids.

While a specific embodiment of the invention has been shown and described, it is to be understood that numerous changes and modifications may be made therein without departing from the scope, spirit and intent of the invention as set forth in the appended claims.

What is claim:

1. A coupler for connecting hoses or tubes together, comprising:

a single component comprising a main housing having a first end for connection to an end of one hose or tube, and a second female end for connection to a male end of a second hose or tube;

and means for releasably locking said first end to an end of a first hose or tube, and for locking said second end to a male end of a second hose or tube;

said second end of said main housing being a female end;

said second end of said housing comprising a contracting, clamping element having an interior surface having threads thereon, and a contact-surface by which said clamping element may be contracted; said means for releasably locking said second end comprising locking means mounted about at least part of said main housing for at least partial movement toward and away from said second end of said main housing, said locking means comprising a first end-portion facing in a direction toward said first end, and a second end-portion facing oppositely to said first end; said second end-portion of said locking means cooperating with said contact-surface for clamping tight said clamping section against a male end of a hose or tube inserted in said second end of said housing when said locking means is moved in the direction of said second end of said housing;

said locking means comprising a rotatable sleeve at least partially rotatable about said main housing; said main housing having exterior threads at a portion thereof, and said first end-portion of said locking means having cooperating threads for mating with said exterior threads of said portion of said main housing, whereby upon rotation of said sleeve in one direction, said sleeve is moved in the direction of said second end, and rotation in the opposite direction moves said sleeve away therefrom; said housing further comprising a limit-stop means for limiting the amount of movement of said locking means in a direction of said second end of said housing.

2. The hose-coupler for connecting hoses together according to claim 1, in combination with a first hose having a female end, and a second hose having a male end; said first male end of said main housing being coupled to said female end of said first hose, and said male end of said second hose being received in said second female end of said main housing.

3. The hose-coupler for connecting hoses together according to claim 1, further comprising a washer element mounted in the interior of said housing at said female end thereof, and means for mounting said washer element in the interior of said housing; said means for mounting comprising an interior sleeve received in the interior of said housing, said interior sleeve and the interior of the housing comprising cooperating means for mounting said sleeve in said housing; said sleeve having an end in abutting engagement against said washer element, whereby when a male end of a second hose is inserted in said female end of said housing, it abuts against said washer element and clamped tight thereagainst by means of said locking means, said washer element also being clamped by means of said locking means.

4. A coupler for connecting hoses, tubes, and the like, together, comprising:

a main housing having a first end for connection to an end of a first element, and a second female end for connection to a male end of a second element;

means for releasably locking said first end to an end of the first element, and for locking said second end to a male end of the second element;

said second end of said housing comprising a plurality of clamping jaw-elements, each said clamping jaw-element having an interior surface having threads thereon, and a contact-surface by which said clamping jaw-elements may be clamped shut; said means for releasably locking said second end comprising locking means mounted about at least part of said main housing for at least partial movement toward and away from said second end of said main housing, said locking means comprising a first end-portion facing in a direction toward said first end, and a second end-portion facing oppositely to said first end; said second end-portion of said locking means cooperating with said contact-surfaces for clamping tight said clamping jaw-elements against a male end of a hose or tube inserted in said second end of said housing when said locking means is moved toward said second end of said housing;

said locking means comprising a rotatable collet at least partially rotatable about said main housing; said main housing having exterior threads at a portion thereof, and said first end-portion of said locking means having cooperating threads for mating with said exterior threads of said portion of said main housing, whereby upon rotation of said collet in the direction of the second end, the clamping jaw element contract to further clamp the male end inserted into the second end and rotation in the opposite direction moves said collet away therefrom, releasing said male end inserted into the second end.

5. The hose-coupler for connecting hoses together according to claim 4, wherein said housing comprises a plurality of longitudinal slots for dividing said housing into a plurality of arcuately-extending clamping sections coextensive with said clamping jaw-elements of said female end of said housing; said longitudinal slots extending between said clamping jaw-elements of said female end of said housing, whereby said clamping sections of said female end are formed.

6. A coupler for connecting hoses, tubes, and the like, together, comprising:

a main housing having a first end for connection to an end of a first element, and a second female end for connection to a male end of a second element;

means for releasably locking said first end to an end of the first element, and for locking said second end to a male end of the second element;

said second end of said housing comprising a plurality of clamping jaw-elements, each said clamping jaw-element having an interior surface having threads thereon; said means for releasably locking said second end comprising locking means mounted about at least part of said main housing for at least partial movement toward and away from said second female end of said main housing, said locking means comprising a first end-portion facing in a direction toward said first end, and a second end-portion facing oppositely to said first end; said second end-portion of said locking means cooperating with said clamping jaw elements for clamping tight said clamping jaw-elements against a male end of a hose or tube inserted in said second end of said housing when said locking means is moved toward said second end of said housing;

and further comprising a washer element mounted in the interior of said housing adjacent said second end thereof, and means for mounting said washer element in the interior of said housing; said means for mounting comprising an interior sleeve received in the interior of said housing, said interior sleeve and the interior of the housing comprising cooperating means for mounting said sleeve in said housing; said sleeve having an end in abutting engagement against said washer element, whereby when a male end of a second hose or tube is inserted in said second end of said housing, it abuts against said washer element and clamped tight thereagainst by means of said locking means, said washer element being clamped by means of said locking means.

* * * * *